_United States Patent Office_

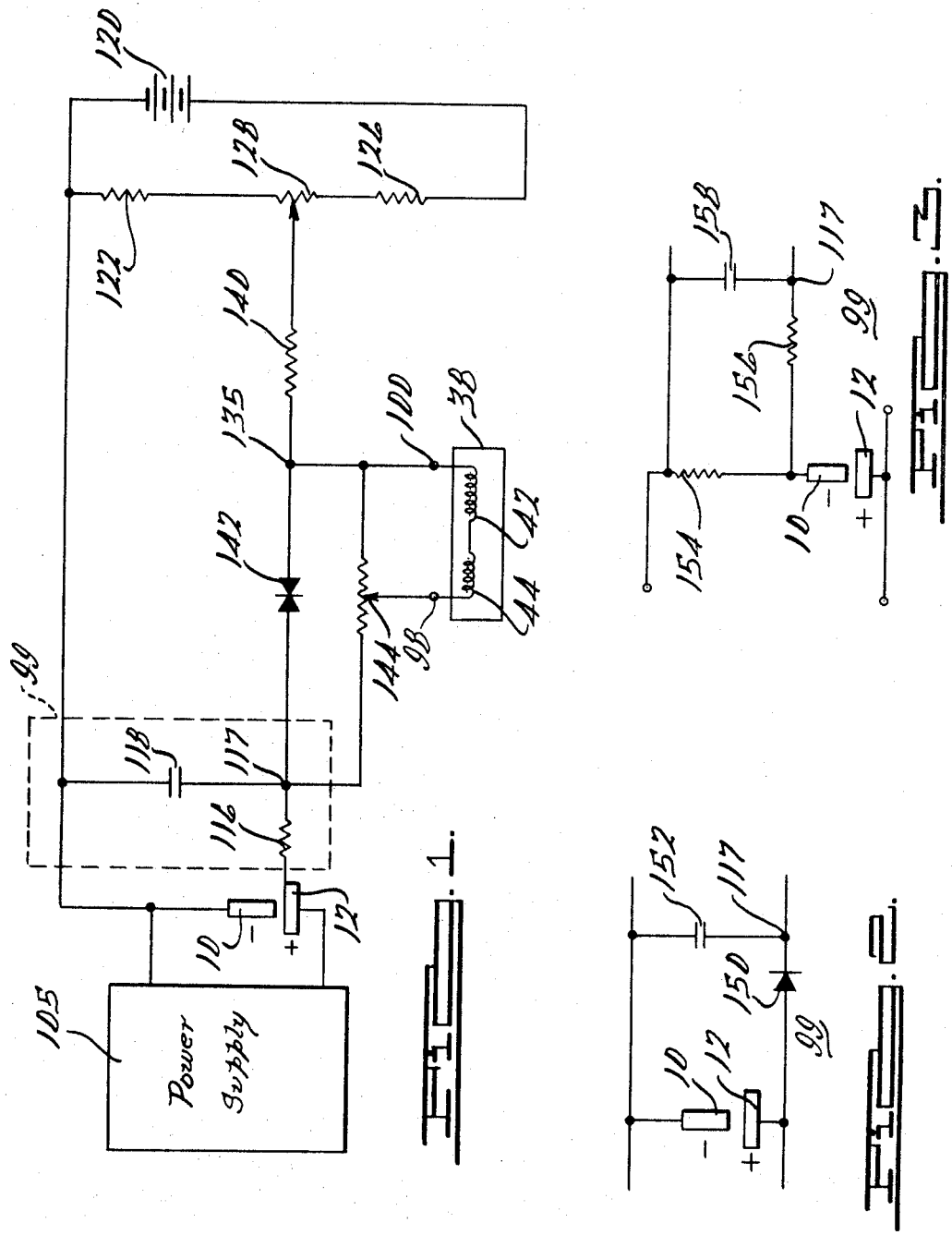

3,437,781
Patented Apr. 8, 1969

3,437,781
SERVO FEED SYSTEM FOR ELECTRICAL DISCHARGE MACHINING
Robert S. Webb, Bloomfield Hills, Mich., assignor, by mesne assignments, to Elox Inc., Troy, Mich., a corporation of Delaware
Filed Sept. 16, 1965, Ser. No. 487,744
Int. Cl. B23p 1/08; G05b 11/00
U.S. Cl. 219—69                  6 Claims

ABSTRACT OF THE DISCLOSURE

A spark discharge servo feed system for controlling gap spacing between electrode and workpiece. The system includes a gap voltage sensing means, a reference voltage source, and an electrically operated motive means connected therebetween. A velocity control potentiometer is connected across the motive means and a double anode refrence diode across the variable resistor of the potentiometer for providing a maximum vlotage limit thereacross.

---

Electrical discharge machining, variously referred to in the art as EDM, spark machining, or arc machining is carried on by passing a series of discrete, localized, extremely high current density discharges across a gap between a conductive tool electrode and a conductive workpiece at sonic or ultrasonic frequencies in the presence of a dielectric fluid for machining the workpiece. In the hydraulic and mechanical servo feeds currently in use, a sensing and control circuit is used to monitor the position of the electrode with respect to the workpiece at all times, to sense electrical characteristics of the gap which characteristics are representative of gap spacing, and to cause advance or retraction of the electrode as required to maintain an optimum gap spacing.

Fluid actuated or hydraulic servo feed systems have certain basic advantages over servo feed systems of the mechanical or electro-mechanical type. Among these advantages are greater speed of response, much greater output forces, and lower control power requirements. The present invention, it will be seen, is equally applicable to servo feed systems of the hydraulic and of the mechanical type.

A primary objective of my invention is to provide an improved electrical control circuit for a servo feed apparatus which is readily adaptable to any electrically controlled servo feed system and effective to provide an improved stability of operation.

It is an additional object of my invention to provide an improved electrical servo feed system having high sensitivity of operation yet employing components of the inert or non-amplifying type.

It is a further object of my invention to provide an improved electrical servo feed system for electrical discharge machining in which the essential functions of velocity and gap voltage control are separately and independently controllable.

Other objects and advantages will become apparent from the following specification which, taken in conjunction with the accompanying drawings, discloses preferred and alternate forms of the invention.

In the drawings, in which reference characters have been used to designate like parts referred to herein:

FIGURE 1 is a schematic diagram showing the electrical control circuit which, responsive to a control signal provided by an electrical characteristic of the gap, controls operation of a servo control valve 38; and FIGURES 2 and 3 are schematic diagrams showing alternate forms of the sensing circuit utilized in connection with the present invention.

With more specific reference to FIGURE 1, it will be seen that I have shown a hydraulic system herein utilized in a power feed system for a tool electrode 10 which is adapted to be fed toward a workpiece 12 for machining the same by intermittent electrical discharges. It will be recognized a reversal of the gap elements may be desirable in some applications in which the electrode is held stationary and the workpiece is moved relative to the electrode. It will be understood that a dielectric fluid flow such as kerosene, distilled water or the like is constantly maintained through the gap.

FIGURE 1 is a schematic diagram showing sensing circuit 99 and further showing the electrical control circuit which provides the electrical control signal for coils 42 and 44 of servo valve 38. The electrode 10 and workpiece 12 are connected across an electrical discharge machining power supply 105 which furnishes machining pulses to the gap. One example of a suitable power supply is shown and described in my U.S. Patent 3,062,985, issued on Nov. 6, 1962. Sensing network 99 comprises a resistor 116 and a capacitor 118 serially connected across the machining gap. Sensing network 99 presents at terminal 117 the average voltage present across the machining gap which in turn is a function of gap spacing. Coils 42 and 44 of servo valve 38 are series connected and phased so that the desired direction of movement of electrode 10 is obtained according to the polarity across the coils. An example of a servo valve and hydraulic servo system adapted for use in conjunction with electrical discharge machining apparatus is shown and described in my U.S. Patent 3,062,192, issued on Nov. 6, 1962. A reference voltage source for the servo system is provided by DC supply 120 which may be derived from the main power supply 105. Connected across DC supply 120 are fixed resistors 122, 126 and potentiometer 128. A bidirectional power flow path is provided through current limiting resistor 140 between point 135 and the movable contact of potentiometer 128. A means is further included for limiting the voltage across coils 42, 44 to a predetermined maximum. This means comprises a non-linear device rendered sharply conductive responsive to the voltage across coils 42, 44 being above a predetermined maximum. More specifically, this means includes a double anode reference diode 142 connected between point 117 and 135 as shown. Double anode diode 142 may alternately be embodied as a pair of Zener diodes mounted in "back to back" relationship as is well known in the art. Potentiometer 144 provides a selectively variable velocity control for the system by tapping off a portion of the differential voltage developed across double anode diode 142.

FIGURES 2 and 3 show two additional embodiments of sensing network 99. The sensing network of FIGURE 2 shows a diode 150 and a capacitor 152 serially connected across the machining gap to provide an output signal which is a function of gap striking voltage. By "gap striking voltage" is meant that gap peak voltage that exists for sufficient time just prior to each gap discharge to breakdown and ionize the dielectric filled gap thereby causing the discharge. The time required for the dielectric breakdown is somewhat dependent upon the magnitude of voltage for a particular gap but is of the order of a microsecond. Transient voltages of much higher magnitude and much shorter duration may exist across the gap without causing breakdown and are thus not included. Capacitor 152 serves to store gap striking voltage which level is reflected at point 117.

FIGURE 3 shows an additional embodiment of sensing circuit 99 in which a signal resistor 154 is connected in series with the gap. Connected across signal resistor 154 are resistor 156 and capacitor 158 to provide a voltage output at point 117 which voltage is a function of current flowing in the gap.

Description of operation

With reference to FIGURE 1, it will be seen that the downfeed and backup of electrode 10 is controlled by electrical signals representative of gap spacing as received by directional control valve 38 i.e. by control coils 42, 44. If reversal of feed is directed by the direction of current flow between the coil terminals 98, 100, valve 38 will cause a corresponding reversal of hydraulic flow for reversing the direction of feed of electrode 10. Where machining conditions are at an optimum with an exceedingly close gap spacing between electrode 10 and workpiece 12, a constant hunting i.e. upward and downward movement of electrode 10 frequently occurs. The objections mentioned hereinabove relative to a hydraulic system are such that the stability of the electrical discharge machining operation is impaired. Overrun in a downward direction may cause the electrode 10 to strike the workpiece 12 resulting in damage to both.

The most important and inventive feature of the servo feed system herein described is provided by the electrical control circuit of FIGURE 1. Stabilization of the entire system during changeover between backup and downfeed conditions is electrically controlled in such a manner that constant hunting of the electrode 10 as is experienced particularly at close gap spacing is minimized. Means is incorporated in the circuit by way of double anode diode 142 for limiting voltage across the coils 42, 44 above a predettermined level according to the preselected voltage breakdown characteristic of the diode 142. It is particularly important to note that below that predetermined maximum level, the sensitivity of the electrical control system is not impaired by this method of control. By reason of the incorporation of rheostat 144, the velocity of both downfeed and backup may be simply and accurately regulated by a single control element. In the operation of the circuit, downfeed of electrode 10 is initiated when average gap voltage measured by sensing circuit 99 and reflected at point 117 is at a level above the reference voltage preset by the movable contact of potentiometer 128. Power flow thus occurs through coils 44 and 42 and resistor 140 to potentiometer 128. The function of double anode diode 142 is to limit the voltage across coils 44, 42 to a predetermined maximum voltage value which may be of the order of, for example, 10 volts. In a backup condition, the level of average gap voltage reflected at point 17 is substantionally lower than the reference voltage at potentiometer 128. Consequently, in the backup condition, power flow will be from potentiometer 128, through resistor 140 through the parallel branches comprising the variable resistance of potentiometer 144 and through servo coils 42, 44, to terminal 117. The present invention serves to positively, yet in a readily adjustable manner, control the operation of the servo valve 38 to maintain the machining gap constant and, further, to preset the limitations for voltage across the electrically energized element comprising servo coils 42, 44 in such a manner that their operation is precisely controlled within predetermined optimum limits.

In the customary mode of operation, the operator makes a setting of potentiometer 128 to preset the reference voltage at which the desired machining voltage will occur. A setting is made by potentiometer 144 to next fix the maximum open or short circuit velocity of the system. High sensitivity continues up to the maximum voltage limit at which double anode diode 142 breaks down and becomes sharply conductive. During operation the advantage of equal up and down velocity is preserved minimizing the time lost in retraction or downfeed caused by bridging of the gap and the required clearing motion.

The operation of the circuit of FIGURE 1 with incorporation therein of the senning circuits 99 as exemplified in FIGURES 2 and 3 is substantially as hereinbefore described, the only difference being in the manner in which the control voltage characteristic of the gap and hence of the function of gap spacing is derived.

While the present invention has been described particularly as to use in electrical discharge machining apparatus, it will be seen that the inventive concept is not limited to such a system but it is applicable to any electrically controlled servo system of the continuous type.

I claim:

1. In combination with electrical discharge machining apparatus having means for passing current across a gap between an electrode and a workpiece in the presence of a dielectric coolant for machining the workpiece, servo means for controlling the gap spacing between the electrode and workpiece comprising, reversible motive means, a sensing means operatively connected to the gap for providing a voltage output representative of an electrical characteristic of the gap, a reference voltage, an electrically energized element for controlling operation of said motive means in response to direction of current flow through said element, and a non-linear means connected across said element for limiting current flow through said element in either direction, said non-linear means being sharply conductive responsive to voltage across said element above a predetermined magnitude.

2. The combination as set forth in claim 1 in which said last-mentioned means comprises a double anode reference diode operatively connected across said element.

3. The combination as set forth in claim 1 wherein said sensing means comprises a resistor and a capacitor serially connected across the gap for sensing average gap voltage.

4. The combination as set forth in claim 1 in which a signal resistor is connected in series with the gap and said sensing means comprises a resistor and a capacitor serially connected across said signal resistor for sening gap current.

5. The combination a set forth in claim 1 in which said sensing means comprises a diode and a capacitor serially connected across the gap for sensing gap striking voltage.

6. In combination with electrical discharge machining apparatus having means for passing current across a gap between an electrode and a workpiece in the presence of a dielectric coolant for machining the workpiece, servo means for controlling the gap spacing between the electrode and workpiece comprising, reversible motive means, a sensing means operatively connected to the gap for providing a voltage output representative of an electrical characteristic of the gap, a reference voltage, an electrically energized element for controlling operation of said motive means in response to direction of current flow through said element, a potentiometer having its slider and a portion of its variable resistor connected across said element, and a double anode reference diode connected across the resistor of said potentiometer, said diode having an identical voltage drop for either direction of current flow therethrough between said sensing means and said reference voltage.

References Cited

UNITED STATES PATENTS 2,882,437    4/1959    McKechnie.
2,939,065    5/1960    Matulaitis.

OTHER REFERENCES

Surge Suppressors Popular Electronics, May, 1964, pp. 78, 79, Ziff-Davis Publishing Co., One Park Ave., New York, N.Y. 10016.

RICHARD M. WOOD, *Primary Examiner.*

R. F. STAUBLY, *Assistant Examiner.*

U.S. Cl. X.R.

318—18